Oct. 17, 1950     H. L. WURGAFT     2,525,990
FEEDING AND CUTTING MEANS FOR CITRUS
FRUIT JUICE EXTRACTORS
Filed Dec. 20, 1947     4 Sheets-Sheet 2
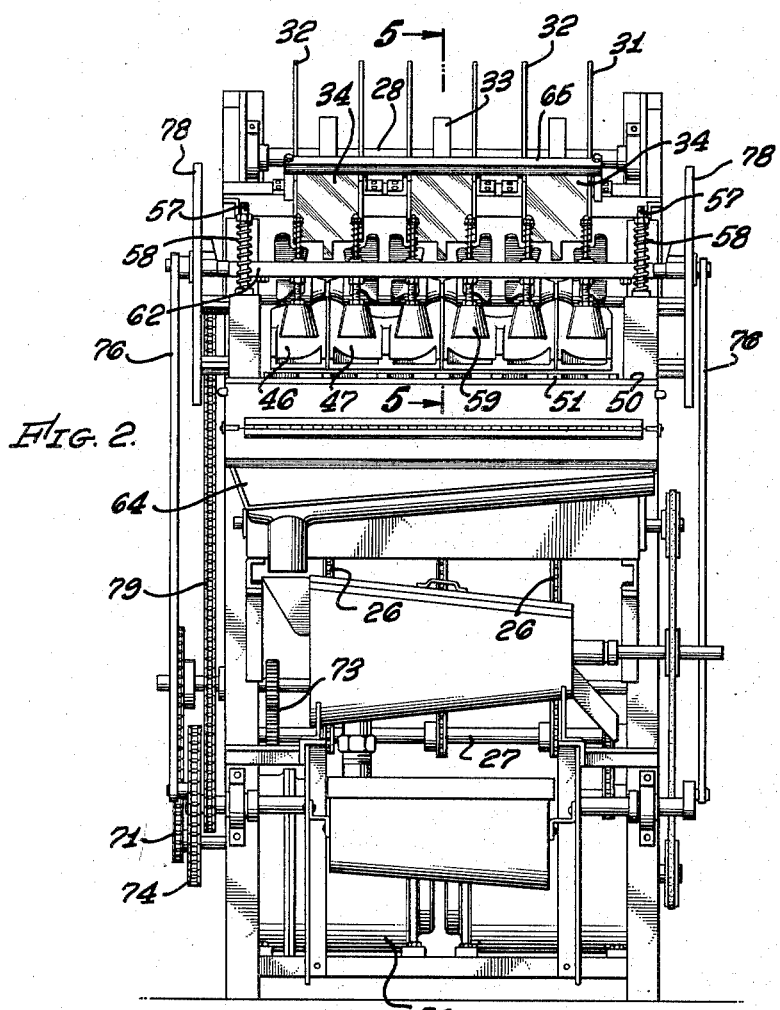
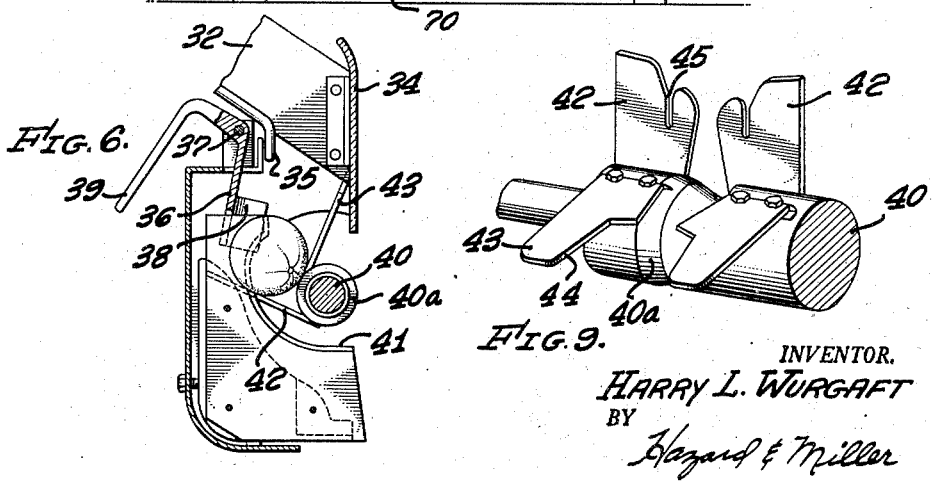
INVENTOR.
HARRY L. WURGAFT
BY
Hazard & Miller
ATTORNEYS.

Oct. 17, 1950     H. L. WURGAFT     2,525,990
FEEDING AND CUTTING MEANS FOR CITRUS
FRUIT JUICE EXTRACTORS

Filed Dec. 20, 1947     4 Sheets-Sheet 3

INVENTOR.
HARRY L. WURGAFT
BY
Hazard & Miller
ATTORNEYS.

Oct. 17, 1950     H. L. WURGAFT     2,525,990
FEEDING AND CUTTING MEANS FOR CITRUS
FRUIT JUICE EXTRACTORS
Filed Dec. 20, 1947     4 Sheets-Sheet 4
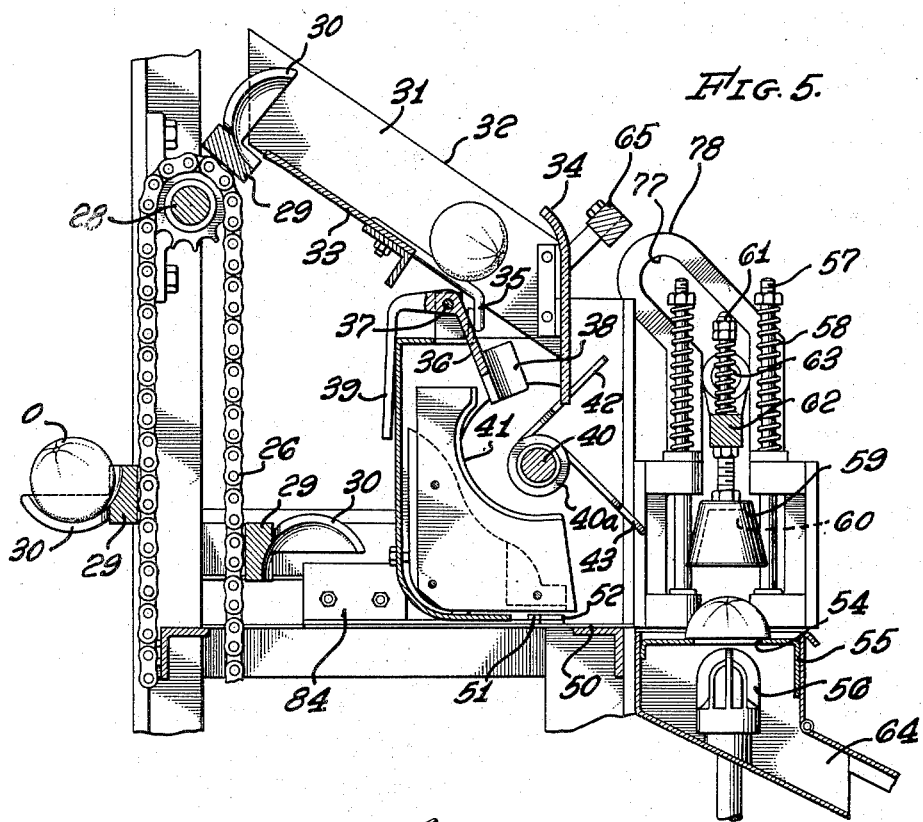
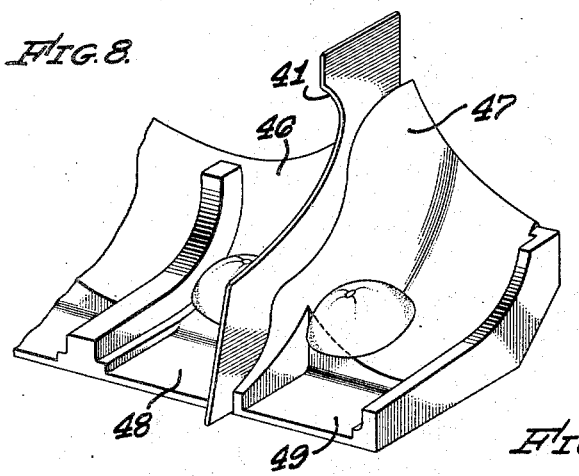
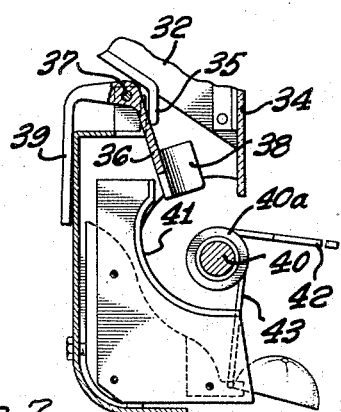
INVENTOR.
HARRY L. WURGAFT
BY
Hazard & Miller
ATTORNEYS.

Patented Oct. 17, 1950

2,525,990

UNITED STATES PATENT OFFICE 2,525,990

FEEDING AND CUTTING MEANS FOR CITRUS FRUIT JUICE EXTRACTORS

Harry L. Wurgaft, Fullerton, Calif., assignor to Fred S. Markham and Maziebelle G. Markham Application December 20, 1947, Serial No. 792,964

10 Claims. (Cl. 146—72)

This invention relates to a feeding and cutting mechanism for feeding and cutting citrus fruit preparatory to squeezing or reaming the citrus fruit to obtain the juice therefrom. The invention may be regarded as an improvement over the mechanisms disclosed in my copending applications, Serial No. 544,343 filed July 11, 1944 now Patent No. 2,517,519 and Serial No. 649,961 filed February 25, 1946 now Patent No. 2,517,520.

In a citrus juice extractor which I have developed a plurality of reamers are located beneath a descendable plate and halves of the citrus fruit are positioned on the plate over apertures therein and are forced downwardly by inverted cups. These cups cause the plate and the halves of the citrus fruit to descend toward the rotating reamers which ream the fruit to obtain the juice therefrom. The cups are then elevated allowing the plate to return to its normal position and the cups are lifted therefrom. The skins or rinds are usually retained within the cups and are lifted thereby from the plate and are turned into expelling positions. Ejectors within the cups eject the skins or rinds while in the turned position and the cups are then returned to a position over the plate to commence another cycle of operation.

It is desirable to provide a simple and efficient mechanism which will enable a mass of citrus fruit to be dumped or otherwise positioned in a hopper and which will consecutively feed the citrus fruit therefrom toward splitting knives which serve to split the fruit into two halves. These halves when split are handled in such a manner as to be delivered in a cut-face down position in advance of the descendable plate and in such a manner that a positioning bar may advance them onto the plate and center them with relation to the apertures therein so that they may be properly positioned with respect to the reamers when the cups force the fruit halves and the plate downwardly toward the reamers.

An object of the present invention is to provide a simple and highly efficient mechanism for accomplishing the above mentioned desiderata which will enable proper timing of the various parts of the apparatus to be secured and so as to prevent any jamming of the fruit in the course of its operation.

More specifically an object of the invention is to provide a feed mechanism for citrus fruit and similar globular objects wherein there is a hopper in one wall of which one or more outlet openings are formed through which the objects may pass consecutively. The hopper has an inclined bottom or inclined supporting surface that will cause the fruit to progress by gravity toward the outlet opening and as a means for preventing jamming across the outlet openings that portion of the supporting surface which is immediately in advance of the outlet openings is transversely movable and reciprocated whereby as the citrus fruit or similar globular objects approach the outlet openings they are moved back and forth in a direction transverse with relation to the direction of inclination of the bottom of the hopper thus preventing the jamming of two fruits across the outlet openings.

Another object of the invention is to provide a feed mechanism for citrus juice extractors wherein the fruits are fed consecutively down an inclined chute one immediately behind the other and are consecutively removed therefrom by a conveyor having spaced cups from which the fruits are consecutively discharged into a second or upper chute at the lower end of which there is a fruit splitting mechanism with the arrangement such that a fruit when deposited on the upper chute will descend therethrough and be split into halves prior to the depositing on the upper or second chute of a second fruit. In this manner jamming of the splitting mechanism is effectively prevented.

Still another object of the invention is to provide a novel, simple fruit splitting mechanism which will assure that when the fruit is split into halves that the halves will be delivered in a cut-face down position so that they may be properly positioned and centered over the apertures in the descendable plate of the reaming mechanism.

With the foregoing and other objects in view, which will be made manifest in the following detailed description and specifically pointed out in the appended claims, reference is had to the accompanying drawings for an illustrative embodiment of the invention, wherein:

Fig. 2 is a view in front elevation of the same and may be considered as taken in the direction of the arrow 2 upon Fig. 1;

Fig. 5 is a partial view in vertical section taken substantially upon the line 5—5 upon Fig. 2 in the direction indicated;

Fig. 6 is a partial view of a portion of Fig. 5 but illustrating a citrus fruit as being in the process of being split on one of the splitting mechanisms;

Fig. 7 is a view similar to Fig. 6 but illustrating the splitting operation as being completed;

Fig. 8 is a partial view in perspective illustrating the manner in which the halves of the split fruit are delivered in a cut-face down position after the fruit has been split; and Fig. 9 is a partial view in perspective illustrating a portion of the rotor.

Figure 1:
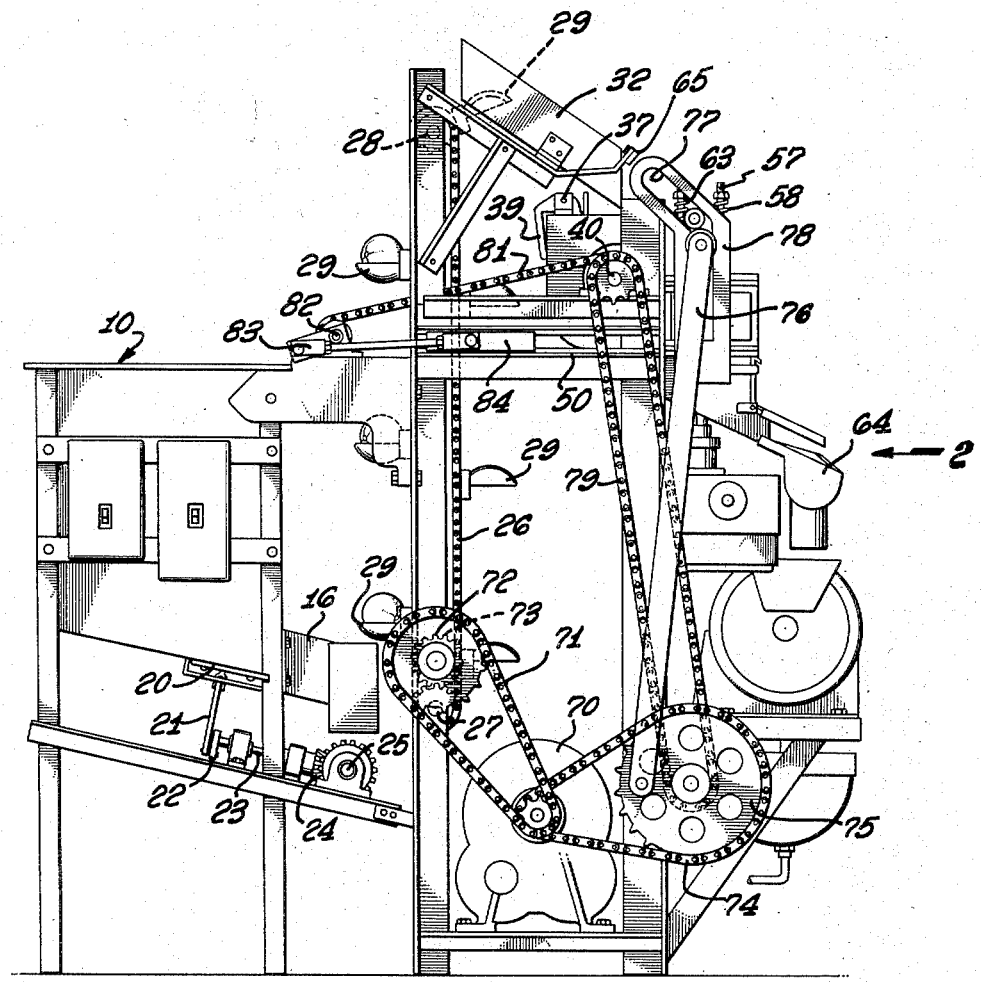
Figure 1 is a view in side elevation of the fruit feeding and splitting mechanism illustrating it in association with the reaming mechanism for reaming the halves of the split fruit after it has been split.

Referring to the accompanying drawings wherein similar reference characters designate similar parts throughout, 10 indicates generally a hopper or bin in which a mass of citrus fruit indicated at O may be dumped. A plate 11 is hingedly connected such as by a hinge 12 to the forward wall of the hopper or bin and normally rests on flanges or angle arms 13 at the sides thereof so as to extend downwardly and rearwardly toward the rear wall of the hopper. This plate terminates short of the rear wall so as the fruit or orange O descends by gravity and they are passed on to the hopper bottom or incline supporting surface 14 which is inclined downwardly toward the front wall of the hopper. The spacing of the plate 11 from the rear wall of the hopper is such that the fruit on passing to the lower supporting surface 14 will be deposited thereon in a single layer.

Figure 3:
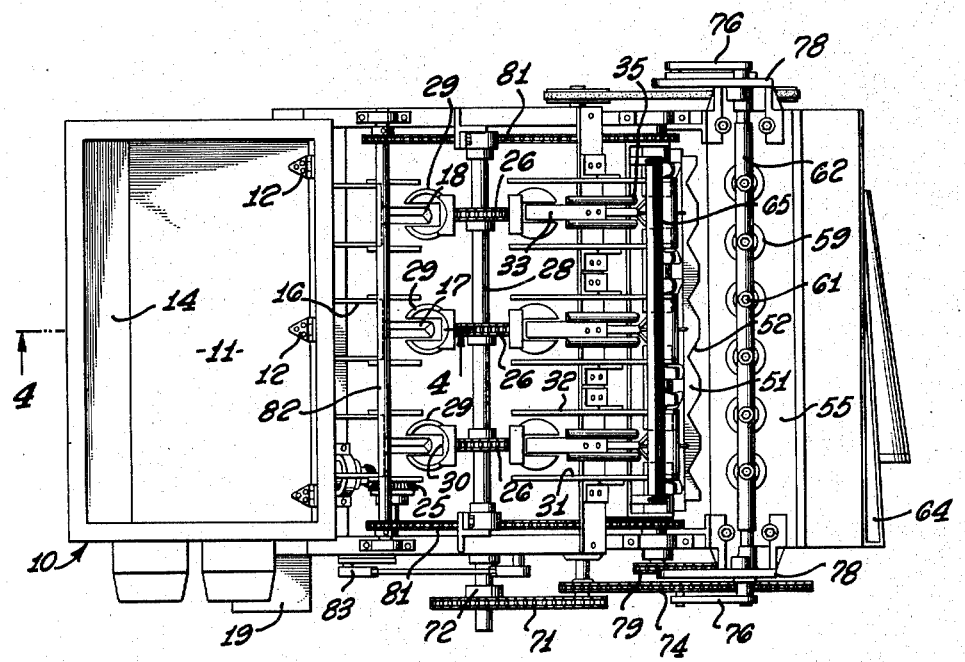
Fig. 3 is a top plan view of the mechanism shown in Fig. 1.
Figure 4:
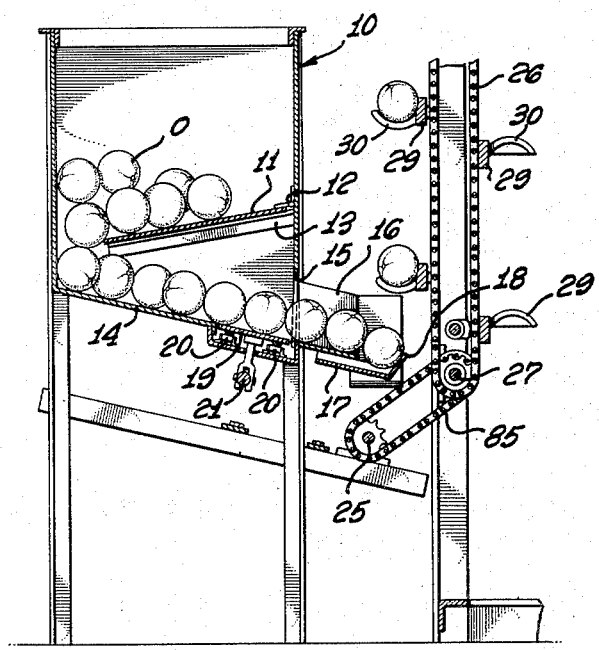
Fig. 4 is a partial view in vertical section taken substantially upon the line 4—4 upon Fig. 3 in the direction indicated.

In the forward wall of the hopper 10 there are outlet openings 15 of such a size as to enable the fruit O to pass therethrough in single file. These openings lead into chutes 16 which terminate at their lower ends in relatively narrow portions 17 on which there are stops 18. That portion of the bottom of the hopper 14 which is immediately in front of the openings 15 is provided by a transversely extending plate 19. This plate is suitably supported on rollers or the equivalent indicated at 20 and is adapted to be laterally reciprocated by connection of a pitman 21 that connects the plate with the crank 22 on a short shaft 23 driven by miter gears 24 forming transversely extending shaft 25 that is power driven. In this manner, as the fruit O descends by gravity on the bottom 14 as they approach the outlet openings 15 they are supported upon the plate 19 which is continually reciprocating in a transverse direction so that should two of the fruits tend to enter the same opening 15 they will be worked back and forth until one precedes the other through the opening and the oranges are thus caused to pass on to the chutes 16 in single file. They then roll down the chutes 16 until they encounter the stops 18 in their respective chutes and may line up one behind the other in contiguous relationship with the lowermost fruit of each file positioned against the stop 18 on the narrowed portion 17 of the chute. Adjacent the lower ends of the chutes 16 there are endless conveyor chains 26 which are trained over sprockets on a transversely extending shaft 27 at their lower ends and which are similarly trained over upper sprockets on a transverse shaft 28 at their upper ends. These conveyor chains have conveyor cups 29 mounted thereon at spaced intervals. Each conveyor cup is longitudinally bifurcated as at 30 (see Fig. 3) to enable the cup to pass over or around the extensions 17. Each cup is designed to receive and elevate the endmost fruit O only in the chute 16 and which is resting against the stop 18 so that as the shaft 27 is rotated the cups 29 will lift the fruit consecutively from the ends of their respective chutes.

Near the upper shaft 28 there are upper chutes 31 which chutes have appropriately spaced sides 32 which confine the fruit on tongues 33 in the bottoms of the chutes which are capable of passing through the bifurcations 30. As each cup 29 passes around its sprocket on the shaft 28 it will empty or discharge its fruit into the upper chute 31 and thereafter pass downwardly over or around the ends of the tongues 33. The fruit having thus been emptied into the upper chute rolls down this chute by gravity toward a vertical retaining wall 34. Each retaining wall is preferably formed of a transparent synthetic resin plastic or similar transparent material and is spaced from the downwardly extending lower end of the bottom of the chute indicated at 35 a sufficient distance to enable the fruit to descend immediately behind the wall 34.

A means for centering the fruit as it passes out of the upper chute is provided consisting of an arm 36 pivoted at 37 and carrying forwardly diverging sides 38. This centering means is urged forwardly by means of a counterweight 39 and when in its forward position the sides or fingers 38 cooperate with the wall 34 in centering the fruit with relation to a curved knife edge 41 disposed adjacent a rotary shaft 40. This knife edge extends from a position immediately below the centering device 36 downwardly and forwardly to a point vertically beneath the shaft. By means of this construction, when the fruit descends through the upper chute 31 it will engage the forwardly divergent fingers 38 which will center the fruit with relation to the knife edge, the centering device tilting in the manner illustrated in Fig. 6 to permit the fruit to pass thereby toward the knife edge 41.

The rotary shaft 40 is circumferentially grooved as at 40a opposite the center of each upper chute and opposite each knife edge. On opposite sides of each groove disposed outwardly with respect to the sides of a knife there are advance paddles or fingers 42 and trailing paddles or fingers 43. The advance fingers are arranged approximately ninety degrees in advance of the trailing fingers 43 on the rotor. The trailing paddles 43 have their opposed edges spaced as indicated at 44 so as to clear the sides of the forwardly divergent fingers 38. The advance fingers 42 are notched as at 45 so that in the course of rotation of the shaft 40 the fingers 38 of the centering device may pass through these notches.

Rotation of the shaft 40 is so timed that the fruit after being centered by the centering device drops toward the shaft 40 between the advance paddles 42 and the trailing paddles 43, as illustrated in Fig. 6, and may rest in the grooves 40a. During the rotation of the shaft 40 the trailing paddles 43 engage the fruit and force it against the curved knife edge 41.

In the sides of each knife edge 41 there are castings or inserts, indicated at 46 and 47 respectively, that provide inclined ramps that slope downwardly and forwardly as well as laternally from the sides of the knife edges. The forward ends of these ramps are recessed as indicated at 48 and 49 to provide bottom surfaces that are substantially flat and horizontal. As the shaft 40 continues its rotation the fruit is forced downwardly on the curved knife edge by the trailing paddles and is split into two halves which descend onto the inclined ramps. The advance fingers 42 which are rotated at a steady or uniform rate may function as restrainers retarding the descent of the halves on the ramps so that the halves will be delivered to the bottoms of the recesses 48 and 49 without turning or rolling over but in a cut-face down position. Thereafter the outer portions of the trailing paddles 43 will engage the fruit halves in the recesses 48 and 49 and slide them forwardly onto a stationary supporting table 50.

Beneath the castings 46 and 47 which provide the ramps there is horizontally reciprocable a positioning bar 51 which has recesses 52 in its forward edge (see Fig. 3) that are arranged in longitudinal alignment with apertures 54 in a descendable supporting table 55. These apertures are arranged vertically over power driven reamers 56. When the halves of the fruit are thus shifted from the bottoms of the recesses 48 and 49 by the fingers 42 and 43 onto the table 50 the bar 51 then advances and engages the halves of the fruit and pushes them in a cut-face down position from the table 50 onto the descendable table 55. The halves of the fruit will naturally tend to occupy the rearmost positions that they can assume in the notches 52 and consequently will be automatically centered thereby so as to be positioned over their respective apertures 54. The descendable table 55 is suspended from rods 57 on which there are nuts bearing on the tops of compression springs 58. Inverted cups 59 are located over each of the apertures 54 and have ejectors 60 disposed therein. These ejectors have stems 61 extending upwardly through the supporting means 62 for the cups so as to be slidable therethrough and are urged into their uppermost positions by means of compression springs 63. After the halves of the fruit have been positioned on the descendable table 55 the supporting means 62 for the cups descends and causes the cups 59 to press the halves of the fruit downwardly. The fruit in turn press the descendable table 55 downwardly compressing the compression springs 58. In this manner the fruit halves are pressed against the tops of the reamers 56 which are continuously rotated and the juice expelled from the fruit halves is collected and discharged through a juice chute 64. When the reaming operation is completed the supporting means 62 for the cups is elevated allowing the table 55 to return to its uppermost position under the action of the compression springs 58 and the rinds or skins of the fruit are usually retained frictionally in the cups 59. The supporting means 62 as it continues in its upward direction tilts the cups and moves the heads of the stems 61 so that they may engage a bar 65. When the ends of the stems engage the bar 65 the stems are forced longitudinally with relation to the cups against the actions of the compression springs 63 so that the ejectors 60 will eject the rinds or skins from the cups in a forward direction so that these may be caught and carried away such as by a conveyor belt located above and forwardly of the juice chute 64. When the skins have been thus ejected from the cups the supporting mechanism 62 returns the cups to the full line position shown in Fig. 5 for the commencement of a subsequent cycle of operation. The construction of the cups and their ejectors is the subject matter of my copending application, Serial No. 649,961 filed February 25, 1946.

As a means for driving the mechanism herein disclosed I employ an electric motor 70 having sprockets on its rotor one of which drives an endless chain 71 trained over a sprocket 72 having a gear drive 73 with shaft 27 whereby the chains on which the cups 29 are mounted can be continuously driven at a relatively reduced speed. The other sprocket on the rotor of the motor 70 drives an endless chain 74 which is trained over a sprocket 75. A pitman 76 on this sprocket is connected to the supporting mechanism 62 for the cups 59 to elevate this supporting mechanism and guide it through angular slots 77 in side plates 78 to cause the cups 59 to vertically lower over the halves of the fruit positioned on the descendable table 55 and on being elevated into the upper portions of these slots to tilt the cups 59 into a forward direction. A sprocket is rigid with the sprocket 75 and an endless chain 79 is trained thereover. This chain is trained over a sprocket 80 on the end of the rotary shaft 40 so that this shaft may be continuously rotated thereby to swing the paddles or impellers mounted thereon into engagement with the fruit that have descended through the chutes 31 and to effect a slicing or splitting of the fruit against the knife edges. Endless chains 81 are trained over sprockets on the shaft 40 and over sprockets on a transversely extending shaft 82. This shaft carries cranks at its ends to which pitmans 83 are connected. The forward ends of these pitmans are pivotally connected to slides 84 which in turn carry the positioning bar 51 so as to horizontally reciprocate the positioning bar from a position beneath the castings 46 and 47 to a position shifting the fruit halves over the apertures 54. The shaft 25 which drives the agitating plate 19 may be driven in any suitable manner such as by a chain drive off of the shaft 27.

The sizes of the various sprockets on the various shafts are such as to properly time certain portions of the mechanism. Thus the rotary shaft 40 is driven at such a speed as to make one complete revolution during the travel of the endless conveyor chains between consecutive cups 29 the intention being to have the cups 29 elevate the fruit from the stops 18 and to discharge one fruit into each of the upper chutes 31 during each revolution of the shaft 40. When the shaft 40 has completed one revolution a succeeding cup 29 will then discharge its fruit into an upper chute 31 and having descended therethrough its fruit will be engaged between paddles or impellers on the shaft 40 and split before a succeeding cup 29 will discharge its fruit into the upper chute 31. In this manner a fruit will have an opportunity to descend through the chute 31 and be centered by the fingers 38 and then split into halves which are deposited on the plate 50 before a succeeding fruit is emptied into the chute 31. Consequently, danger of clogging or jamming in or near the fruit slicing knives 41 is effectively prevented in that succeeding fruit may not enter the locality of the knives 41 until the previous fruit has been split and disposed of. The reciprocation of the positioning bar 51 likewise is timed to make one complete reciprocation during each rotation of the shaft 40 so as to shift the halves of the fruit from the stationary plate 50 onto the descendable table 55 and returned to its initial position before a succeeding group of halves is deposited on the plate 50. The lowering of the cups 59 to ream the fruit and the elevating of the supporting mechanism 62 to a position to eject the rinds likewise takes place once per revolution of shaft 40. In this manner although the fruit may be dumped loosely in the hopper or bin 10 and are fed therefrom through the chute 16 the fruits are delivered to the slicing mechanism in proper timed relationship so that they will be split and delivered to the reaming mechanism in proper timed relationship with respect to its operation.

It will be appreciated from the above described construction that an improved citrus juice extracting mechanism is provided enabling the fruit to be dumped in bulk into a hopper or bin and that the fruit issues therefrom without danger of clogging or jamming into one or more separate rows or files. From these files the fruit is individually conducted by a conveyor in timed relationship to a splitting mechanism which will split and deliver the halves of the fruit in a cut-face down position and in proper timed relationship for feeding to the reaming mechanism. The reaming mechanism then forces the halves of the fruit into engagement with the reamers and the juice extracted is collected. The rinds or skins are then ejected from the cups 59 and can be collected and disposed of separately from the juice.

Various changes may be made in the details of construction without departing from the spirit and scope of the invention as defined by the appended claims.

I claim:

1. A fruit slicer comprising a knife having a curved cutting edge and lying in a vertical plane, separator means on the opposite sides of the knife, a rotor mounted on an axis normal to and extending across said knife in opposed relation to the cutting edge and disposed nearer the bottom of the edge than the top thereof, means for feeding fruit in centered relation to the knife edge, means on the rotor for engaging the fruit and forcing it against the knife edge to split the fruit, the separator means at the sides of the knife presenting surfaces sloping away from the sides of the knife on which the halves of the split fruit may slide cut face down, means limiting outward sliding movement of the halves, and means on the rotor engageable with the halves thus limited for moving the halves forwardly.

2. A fruit slicer comprising an inclined chute terminating in spaced relation to a fixed wall enabling fruit placed in the chute to descend between the end of the chute and the wall, yieldable centering means for temporarily engaging opposed portions of a fruit and positioning the fruit against the wall, an inclined knife edge beneath the yieldable means and lying in a vertical plane substantially normal to said wall, a rotor forwardly of the knife edge, and means on the rotor adapted to engage the fruit while positioned against the wall and force it against the knife edge to split it.

3. A fruit slicer comprising an inclined chute terminating in spaced relation to a fixed wall enabling fruit placed in the chute to descend between the end of the chute and the wall, yieldable centering means for temporarily engaging opposed portions of a fruit and positioning the fruit against the wall, an inclined knife edge beneath the yieldable means and lying in a vertical plane substantially normal to said wall, a rotor forwardly of the knife edge, means on the rotor adapted to engage the fruit while positioned against the wall and force it against the knife edge to split it, and means providing downwardly, outwardly, and forwardly inclined surfaces at the sides of the knife edge on which the halves of the fruit may slide downwardly and forwardly from the sides of the knife edge in cut face down position.

4. A fruit slicer comprising an inclined chute terminating in spaced relation to a wall enabling fruit placed in the chute to descend between the end of the chute and the wall, yieldable means for temporarily positioning the fruit against the wall, an inclined knife having a cutting edge beneath the yieldable means, a rotor forwardly of the knife edge, fingers on the rotor on opposite sides of the knife edge engageable with the fruit while positioning against the wall to force the fruit downwardly against the knife edge, and outer fingers disposed outwardly with respect to the sides of the knife, there being downwardly, outwardly, and forwardly inclined surfaces at the sides of the knife edge, the outer fingers serving to limit outward sliding of the halves of the fruit as they descend over said surfaces after having been split.

5. A fruit slicer comprising an inclined chute terminating in spaced relation to a wall enabling fruit placed in the chute to descend between the end of the chute and the wall, yieldable means for temporarily positioning the fruit against the wall, an inclined knife having a cutting edge beneath the yieldable means, a rotor forwardly of the knife edge, fingers on the rotor on opposite sides of the knife edge engageable with the fruit while positioned against the wall to force the fruit downwardly against the knife edge, outer fingers disposed outwardly with respect to the sides of the knife, there being downwardly, outwardly, and forwardly inclined surfaces at the sides of the knife edge, the outer fingers serving to limit outward sliding of the halves of the fruit as they descend over said surfaces after having been split, there being a table forwardly of said surfaces on which the halves of the fruit may be positioned by the first-mentioned fingers, and reciprocable positioning means for advancing the halves of the fruit forwardly on said table.

6. In a citrus fruit juice extractor, the combination of an inclined chute having an end wall and in which the fruit is adapted to travel in single file, the chute having a discharge opening in its bottom adjacent the end wall, a transfer arm pivotally supported adjacent the end of the chute and having means at its end cooperating with the end wall of the chute to position a fruit therebetween, a knife mounted centrally of the centering means and in a vertical plane substantially normal to said wall and to the edge of which knife the fruit is delivered by the transfer arm, a divided pusher means adapted to force the fruit along and over the knife to cut the fruit into two halves, a platform to receive the fruit with its cut surface downward on the platform, and a separator means adjacent the knife on each side thereof over which the cut halves of the fruit slide after leaving the knife and said separator means providing a slide along which the cut half of the citrus fruit moves in passing from the knife and pusher to the platform.

7. A fruit slicer comprising a knife having a curved cutting edge lying in a vertical plane, separator means on the opposed sides of the knife, a rotor mounted on an axis normal to and extending across said knife in opposed relation to the cutting edge and disposed nearer the bottom of the edge than the top thereof, means for feeding fruit at centered relation to the knife edge, paddles on the rotor for engaging the fruit and forcing it against the knife edge to split the fruit, said separator means at the sides of the knife presenting surfaces sloping away from the sides of the knife on which the halves of the split fruit may freely slide cut face down, means limiting outward sliding movement of the halves and the paddles on the rotor engageable with the halves thus limited for moving the halves forwardly.

8. A fruit slicer comprising an inclined chute terminating in spaced relation to a fixed wall enabling fruit placed in the chute to descend between the end of the chute and the wall, yieldable centering means for temporarily engaging opposed portions of a fruit and positioning the fruit against the wall, an inclined knife edge beneath the yieldable means and lying in a vertical plane substantially normal to said wall, a rotor forwardly of the knife edge and paddles on the rotor adapted to engage the fruit while positioned against the wall and force it against the knife edge to split it.

9. A fruit slicer comprising an inclined chute terminating in spaced relation to a fixed wall enabling fruit placed in the chute to descend between the end of the chute and the wall, yieldable centering means for temporarily engaging opposed portions of a fruit and positioning the fruit against the wall, an inclined knife edge beneath the yieldable means and lying in a vertical plane substantially normal to said wall, a rotor forwardly of the knife edge, paddles on the rotor adapted to engage the fruit while positioned against the wall and force it against the knife edge to split it, and means providing downwardly, outwardly and forwardly inclined surfaces at the sides of the knife edge on which the halves of the fruit may freely slide downwardly and forwardly from the sides of the knife edge in cut face down position.

10. A fruit slicer comprising a knife edge lying in a vertical plane, a rotor adjacent the knife edge disposed normal to the knife edge and nearer the bottom of the knife edge than the top thereof and having a circumferentially extending peripheral groove for receiving fruit in centered relation to said knife edge, means for feeding fruit to said groove, means on the rotor for engaging the fruit and forcing it against the knife edge to split the fruit, and means at the sides of the knife presenting surfaces sloping downwardly and outwardly away from the sides of the knife on which the halves of the split fruit may slide cut face down.

HARRY L. WURGAFT.

REFERENCES CITED

The following references are of record in the file of this patent:

UNITED STATES PATENTS

| Number | Name | Date |
|---|---|---|
| 435,153 | Numsen | Aug. 26, 1890 |
| 1,064,531 | Ott | June 10, 1913 |
| 1,107,991 | Park | Aug. 18, 1914 |
| 1,130,819 | Hill | Mar. 9, 1915 |
| 1,168,838 | Weber | Jan. 18, 1916 |
| 1,555,929 | Allan | Oct. 6, 1925 |
| 1,803,521 | Bergerioux | May 5, 1931 |
| 1,888,528 | Faulds | Nov. 22, 1932 |
| 1,890,155 | Israelson | Dec. 6, 1932 |
| 2,311,565 | Nelson | Feb. 16, 1943 |
| 2,428,157 | Healy | Sept. 30, 1947 |